(12) United States Patent
Eberhardt et al.

(10) Patent No.: US 6,636,277 B2
(45) Date of Patent: Oct. 21, 2003

(54) HEAD-UP DISPLAY

(75) Inventors: Bernd Eberhardt, Dieburg (DE); Bernd Ludewig, Hirschberg (DE); Ralf Mayer, Bolanden (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/013,035

(22) Filed: Dec. 7, 2001

(65) Prior Publication Data

US 2002/0089613 A1 Jul. 11, 2002

(30) Foreign Application Priority Data

Dec. 15, 2000 (DE) .......................... 100 62 723

(51) Int. Cl.⁷ .................. G02F 1/1335; G02B 27/14
(52) U.S. Cl. .......................... 349/11; 359/630
(58) Field of Search ................ 349/11, 96, 5, 349/9; 359/487, 493, 494, 485, 630, 631

(56) References Cited

U.S. PATENT DOCUMENTS

| | | | |
|---|---|---|---|
| 5,459,645 A | * 10/1995 | Sattler et al. | 362/558 |
| 5,867,287 A | * 2/1999 | Williams et al. | 349/11 |
| 6,100,943 A | * 8/2000 | Koide et al. | 349/11 |
| 6,507,436 B2 | * 1/2003 | Nishkawa et al. | 359/487 |

FOREIGN PATENT DOCUMENTS

| | | |
|---|---|---|
| DE | 3712663 | 10/1988 |
| DE | 19540108 | 4/1997 |
| EP | 0424949 | 10/1990 |
| EP | 0836108 | 10/1997 |
| EP | 0844507 | 11/1997 |

* cited by examiner

*Primary Examiner*—Toan Ton
(74) *Attorney, Agent, or Firm*—Martin A. Farber

(57) ABSTRACT

A head-up display for vehicles, in which information from a display device is projected onto a transparent projection area, the display device has two transparent screens between which a liquid crystal substance and electrodes are arranged, polarized light penetrating through the liquid crystal substance, the liquid crystal substance rotating the polarized light penetrating through the liquid crystal substance in a plane of polarization in a manner dependent on the driving of the electrodes with a voltage. The polarized light emerging form the liquid crystal substance is not sent through a polarizer, but rather is polarized by the reflection at the transparent projection area or at one or more other reflectors which is or are arranged in the beam path of the polarized light between the liquid crystal substance and the transparent projection area.

4 Claims, 3 Drawing Sheets

HEAD-UP DISPLAY

FIELD AND BACKGROUND OF THE INVENTION

The invention relates to a head-up display for vehicles, in which information from a display device is projected onto a transparent projection area. It is known from the prior art to transilluminate a liquid crystal display (LCD) as the display device and to display the light beams passing through the liquid crystal display on a transparent projection area, for example the front screen. Thus, the driver of a vehicle can receive information without having to avert his/her gaze from the traffic situation in front of his/her vehicle. The known liquid crystal displays have two transparent screens which are arranged at a distance and on which electrodes are arranged. A liquid crystal substance is arranged between the electrodes. A respective polarizer is applied on the external surfaces of the transparent screens. Provided that no voltage is present at two opposite electrodes, the direction of polarization of light beams which penetrate through the liquid crystal substance is rotated through 90 degrees. If a voltage is present at the electrodes, no rotation takes place when light penetrates through the liquid crystal substance. Provided that the directions of polarization of the two polarizers are rotated through 90 degrees, light can penetrate through the liquid crystal display if no voltage is present at the electrodes, since the plane of polarization of the light when penetrating through the liquid crystal substance is likewise rotated through 90 degrees. If a voltage is present, the direction of polarization of the light is not rotated, so that the light cannot penetrate through the second polarizer. It is known from the prior art, for example, for the liquid crystal displays to be embodied as dot matrix displays. Thus, information composed of individual pixels can be represented depending on the driving of the individual electrodes of the dot matrix display. The use of such known liquid crystal displays in a head-up display has the disadvantage that a very powerful light source has to be used, since, firstly, the brightness of the light on the transparent projection area must be great enough that the information can readily be perceived even in bright daylight, and the known liquid crystal displays allow only a small amount of light to pass through owing to the doubled light absorption by the two polarizers. It is thus necessary to provide a powerful light source, which consumes a large amount of energy and thereby produces undesirable heat which then has to be dissipated with a large outlay.

SUMMARY OF THE INVENTION

It is an object of the present invention, therefore, to specify a head-up display with a display device with a liquid crystal substance, in which the light source requires less energy. This object is achieved by virtue of the fact that the light which emerges from the liquid crystal substance is not sent through a polarizer, which is customary in a liquid crystal display, rather that the second polarization is effected by the reflection of the light, either at the transparent projection area or at one or more mirrors which are arranged in the beam path of the polarized light between the liquid crystal substance and the transparent projection area.

The transparent projection area may be part of the front screen of the vehicle or a separate screen arranged between the front screen and the driver.

BRIEF DESCRIPTION OF THE DRAWINGS

The invention is explained in more detail below with reference to the figures.

In the figures.

DETAILED DESCRIPTION OF THE PREFERRED EMBODIMENT

Figure 1:
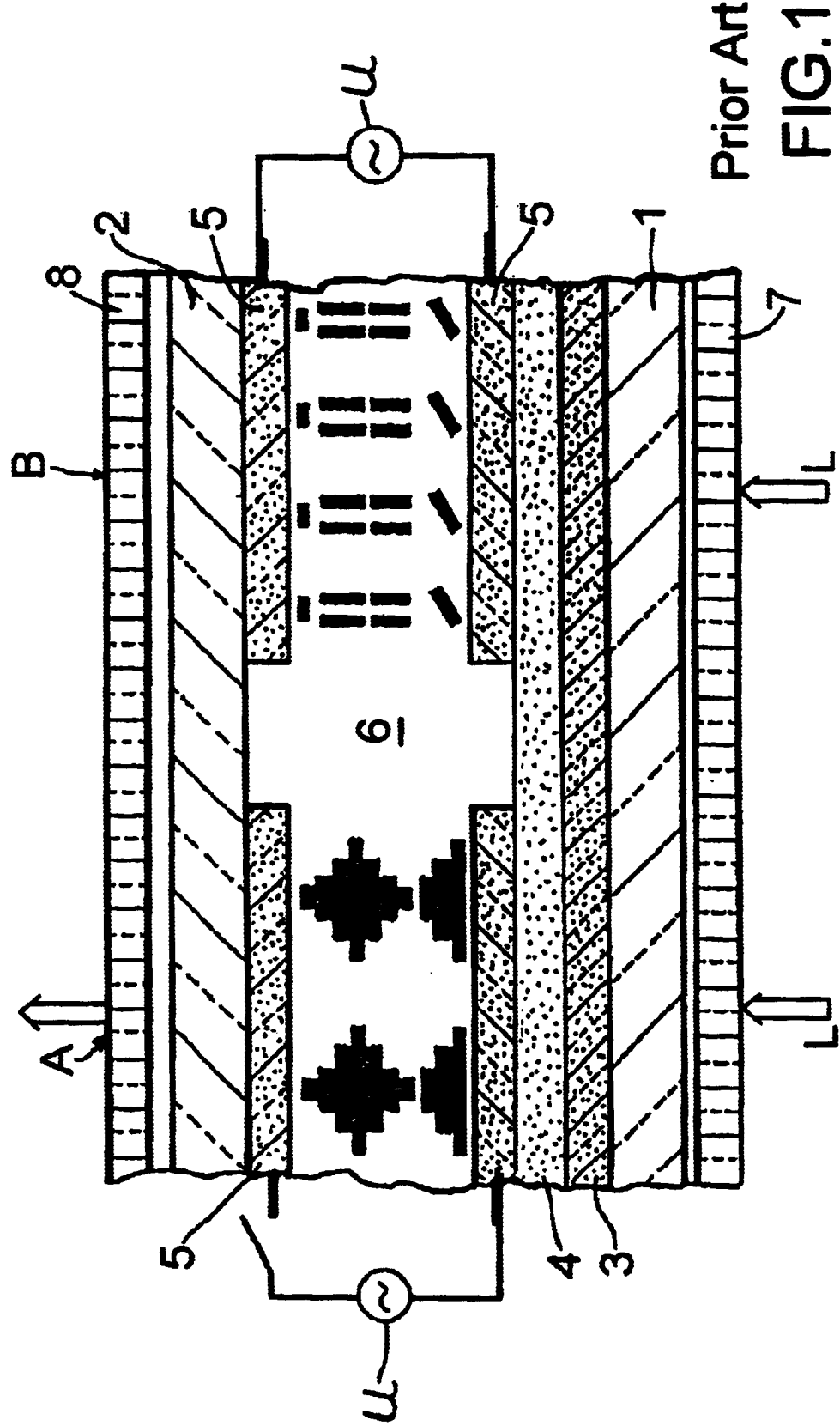
FIG. 1 shows a partial section through a liquid crystal display according to the prior art.

In a partial section through a liquid crystal display in the form of a dot matrix display, FIG. 1 shows the section through two pixels A, B. The partial section through a liquid crystal display shows a front transparent wall 1 and a rear transparent wall 2. Arranged on the front transparent wall 1 is a transparent heating layer 3 with a transparent insulation 4. Transparent electrodes 5 are arranged on the transparent insulation 4 and the transparent wall 2. At their ends which are not illustrated, the front transparent wall 3 and the rear transparent wall 2 are connected to one another by means of side walls, thereby forming a closed space formed by the side walls, the electrodes 5, the transparent insulation 4 and the rear transparent wall 2. This space is filled with liquid crystal substance 6. A respective polarizer 7, 8 is arranged on the outside of the front and rear transparent walls 1, 2, which polarizer in each case allows only light of a specific plane of polarization to pass through. The planes of polarization of the polarizers 7, 8 are perpendicular to one another.

If no voltage is present at two mutually opposite electrodes 5, as shown in the example the electrodes 5 on the left-hand side for a pixel A, the liquid crystal substance 6 rotates the plane of polarization of the light which penetrates through it through 90 degrees, so that the light polarized by the polarizer 7 can pass through the polarizer 8.

Provided that a voltage U is present at the electrodes 5, as shown in the example on the right-hand side for a pixel B, the liquid crystal substance 6 does not rotate the plane of polarization of the penetrating light. Thus, the light cannot penetrate through the polarizer 8. As a result, a viewer sees a bright pixel A on the left-hand side and a dark or no pixel B on the right-hand side.

The heating layer 3 extends the temperature range in which the liquid crystal display can effectively operate; however, at normal ambient temperatures, said heating layer and likewise the transparent insulation 4 that is present for the heating layer 3 are not necessary for the functioning.

Figure 2:
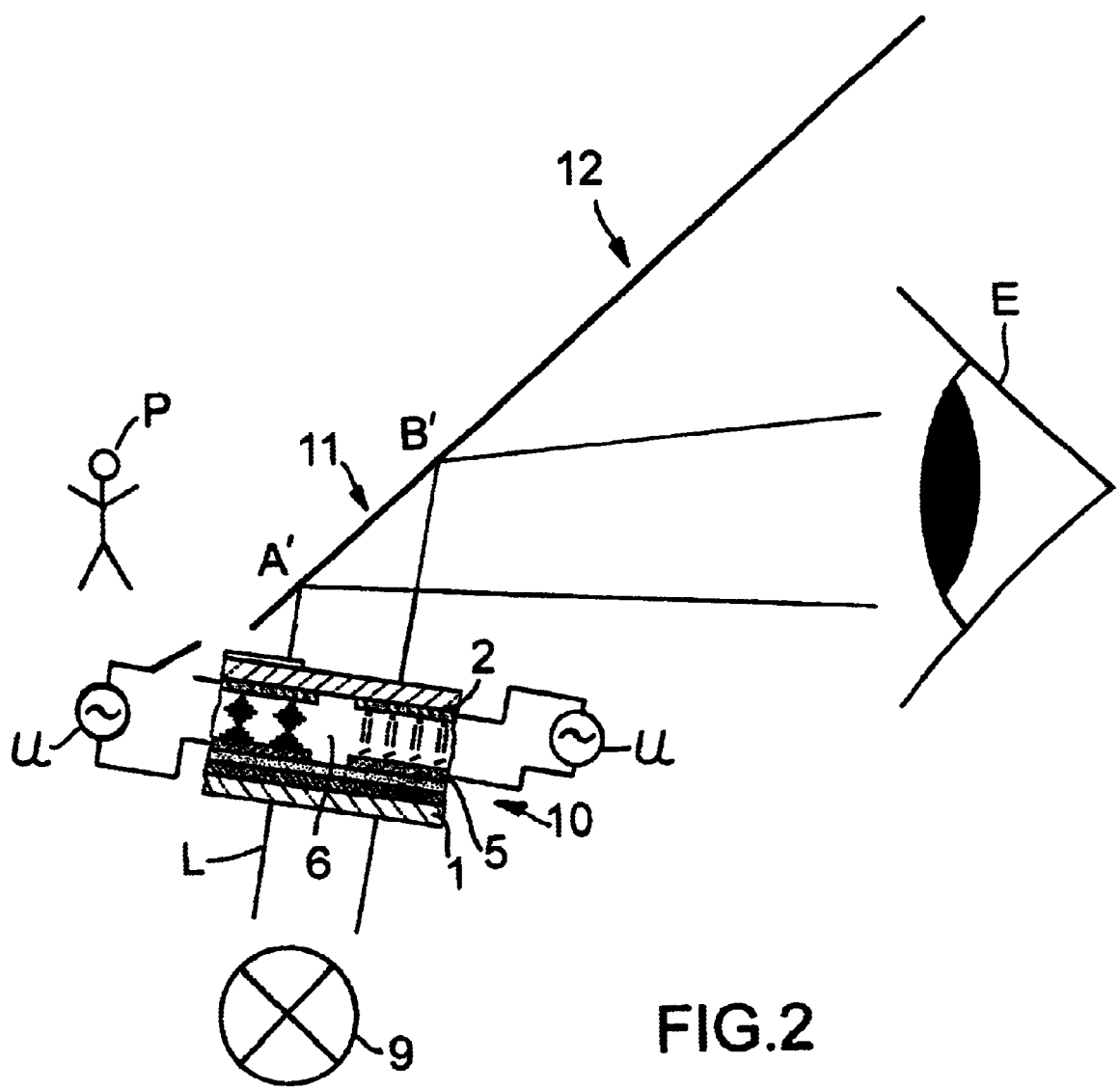
FIG. 2 shows an exemplary embodiment of the head-up display according to the invention.

In FIG. 2, the exemplary embodiment of the head-up display according to the invention has a light source 9, a display device 10 and a transparent projection area 11. The transparent projection area 11 is part of a front screen 12 of a vehicle that is otherwise not illustrated, with the result that a driver of the vehicle, whose eye is designated by E, can simultaneously see both the pixels A', B' projected onto the projection area and the traffic situation in front of the front screen, for example a person P located in his direction of travel. In order to improve the illustration, only two pixels A, B are displayed by the display device 10. Practical embodiments will use a number of dozens up to hundreds of thousands of pixels, depending on the desired resolution. The display device 10 is constructed like the liquid crystal display from FIG. 1, with the exception that it has no polarizers 7, 8. The light source 9 sends already polarized light through the display device 10. The liquid crystal substance 6 on the left-hand side of the display device 10 rotates the plane of polarization of incident light beams L through 90 degrees, since no voltage is present at the electrode 5 on the left-hand side. The liquid crystal substance 6 on the right-hand side of the display device 10 does not rotate the plane of polarization since a voltage is applied between the electrodes 5 on the right-hand side.

The transparent projection area 11 acts as second polarizer and has, for example, a plane of polarization which is perpendicular to the plane of the drawing of FIG. 2. If the light source 9 then emits polarized light whose plane of polarization is parallel to the plane of the drawing of FIG. 2, the light on the left-hand side of the display device 10 at pixel A is rotated perpendicularly to the plane of the drawing, while the plane of polarization of the light at pixel B remains horizontal with respect to the plane of the drawing. Since the plane of polarization of the transparent projection area 11 is perpendicular to the plane of the drawing, only the light of pixel A is reflected at the point A' to the eye E, while the light of pixel B is not reflected at the point B'. Thus, as a result, only light from pixels whose electrodes 5 are not driven with a voltage passes to the eye E.

If a viewer were to look directly at the display device 10, he would see pixels of equal brightness, irrespective of the driving of the electrodes, since the light can leave the display device 10 unimpeded.

Instead of using a polarized light source, it is also possible to provide a customary light source and to provide a first polarizer between the light source and the liquid crystal substance 6 of the display device 10, for example on the outside of the display device 10. The second polarizer can also be realized by a reflector comprising two materials with different optical refractive indices, for example made of glass mirrors.

Figure 3:
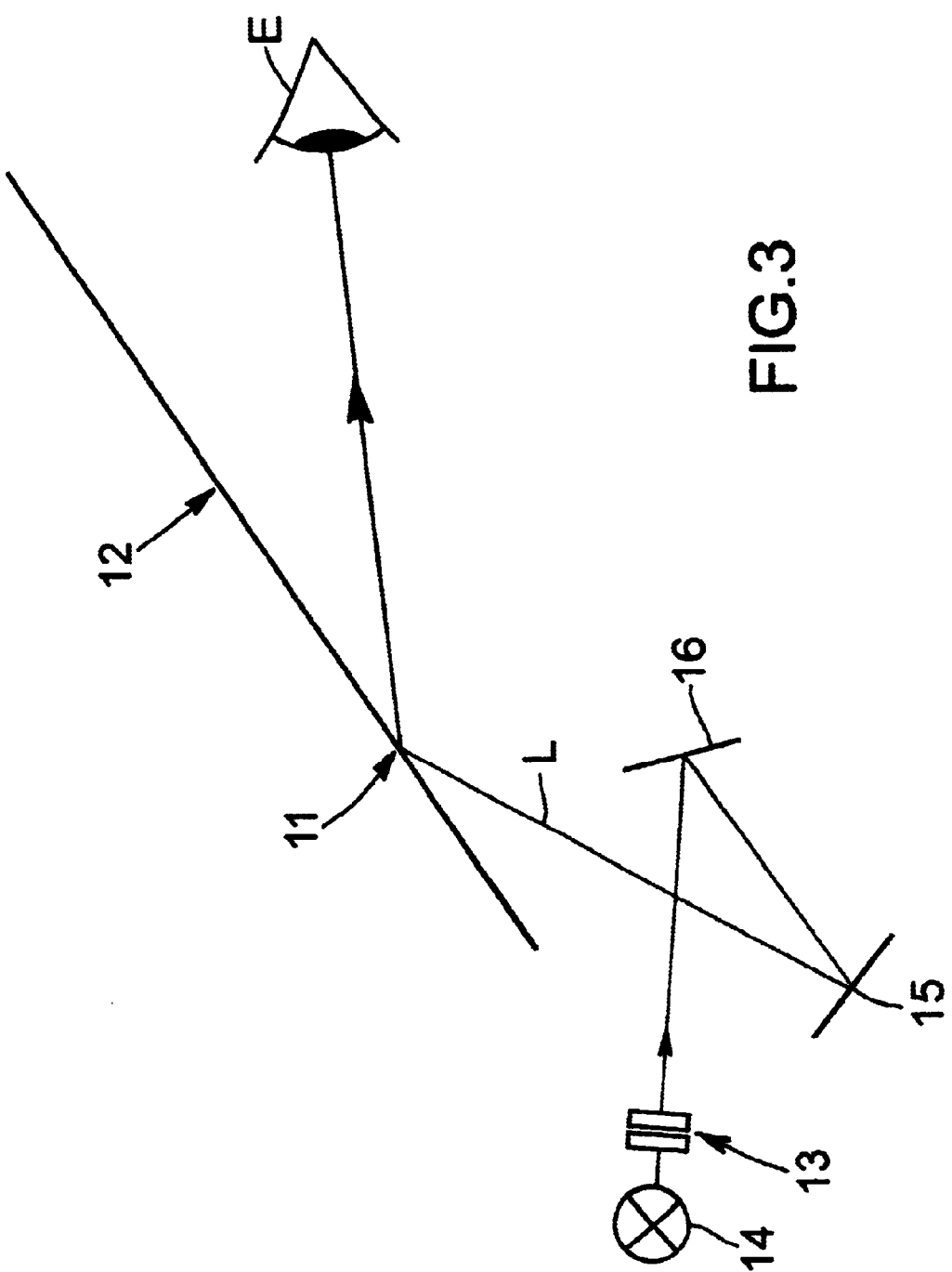
FIG. 3 shows a further exemplary embodiment of the head-up display according to the invention.

FIG. 3 shows a further example. A display device 13 already has a first polarizer 7 on its side toward a light source 14 and thus differs from the LCD in FIG. 1 only in that it does not have a second polarizer 8. Furthermore, in contrast to FIG. 2, deflection mirrors made of metal 15, 16 are present. The deflection mirrors serve for image magnification and/or image correction. Polarization does not take place therein owing to their material.

We claim:

1. A head-up display for a vehicle, in which information from a display device (10, 13) is projected onto a transparent projection area (11), the display device (10, 13) having two transparent screens (1, 2) between which a liquid crystal substance (6) and electrodes (5) are arranged, polarized light penetrating through the liquid crystal substance (6), the liquid crystal substance (6) rotating the polarized light penetrating through the liquid crystal substance in a plane of polarization in a manner dependent on the driving of the electrodes (5) with a voltage, wherein the polarized light emerging from the liquid crystal substance (6) is not sent through a polarizer, but is polarized by the reflection at the transparent projection area or at least one reflectors which is or are arranged in beam path of the polarized light between the liquid crystal substance (6) and the transparent projection area (11).

2. The head-up display as claimed in claim 1, wherein a front screen (12) of the vehicle is used as the transparent projection area (11).

3. The device as claimed in claim 2, wherein a polarizer (7) is arranged between the display device (13) and the light source (14).

4. The device as claimed in claim 1, wherein a polarizer (7) is arranged between the display device (13) and a light source (14).

* * * * *